US008707291B2

(12) United States Patent
Hale et al.

(10) Patent No.: US 8,707,291 B2
(45) Date of Patent: Apr. 22, 2014

(54) FIRMWARE RECOVERY OF WIRELESS DEVICES (75) Inventors: Nathan A. Hale, Henderson, CO (US); Jeremy S. Mickelsen, Denver, CO (US); William R. Reams, Englewood, CO (US); David A. Innes, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 1135 days.

(21) Appl. No.: 12/262,955

(22) Filed: Oct. 31, 2008

(65) Prior Publication Data

US 2010/0115576 A1 May 6, 2010

(51) Int. Cl.
*G06F 9/44* (2006.01)
*H04N 7/20* (2006.01)

(52) U.S. Cl.
USPC ............. 717/172; 717/168; 717/171; 725/63; 725/153

(58) Field of Classification Search
None
See application file for complete search history.

(56) References Cited

U.S. PATENT DOCUMENTS

| | | | | |
|---|---|---|---|---|
| 5,216,675 A * | 6/1993 | Melliar-Smith et al. | ...... | 714/748 |
| 6,343,379 B1 * | 1/2002 | Ozawa et al. | .................. | 725/63 |
| 7,031,263 B1 * | 4/2006 | Sun et al. | ....................... | 370/252 |
| 7,055,148 B2 * | 5/2006 | Marsh et al. | .................. | 717/172 |
| 7,373,106 B2 * | 5/2008 | Ikeda | ........................... | 455/26.1 |
| 7,673,301 B1 * | 3/2010 | Righi et al. | .................... | 717/172 |
| 7,805,751 B1 * | 9/2010 | Dugan et al. | .................. | 725/153 |
| 7,861,119 B1 * | 12/2010 | Righi et al. | ................... | 714/38.1 |
| 8,031,270 B1 * | 10/2011 | Wisniewski et al. | .......... | 348/734 |
| 2002/0133598 A1 * | 9/2002 | Strahm et al. | ................ | 709/228 |
| 2003/0023964 A1 * | 1/2003 | Rajaram et al. | ................ | 717/172 |
| 2004/0068721 A1 * | 4/2004 | O'Neill et al. | ................ | 717/168 |
| 2005/0229173 A1 * | 10/2005 | Mihm et al. | .................. | 717/171 |
| 2008/0005346 A1 * | 1/2008 | Schoinas et al. | ............. | 709/230 |
| 2008/0186131 A1 * | 8/2008 | Hanai et al. | .................... | 340/5.2 |
| 2008/0232431 A1 * | 9/2008 | Sanji et al. | ..................... | 375/130 |
| 2009/0307677 A1 * | 12/2009 | Long et al. | .................... | 717/168 |
| 2010/0028010 A1 * | 2/2010 | Zhao et al. | .................... | 398/106 |

OTHER PUBLICATIONS

Deal, R., CCNA Cisco Certified Network Associate Study Guide (Exam 640-802), McGraw-Hill, Apr. 24, 2008, 8 pages, [retrieved on Sep. 20, 2012], Retrieved from the Internet: <URL:http://techbus.safaribooksonline.com/>.*

Oakes, K. J., et al., Enhanced I/O subsystem recovery and availability on the IBM System z9, IBM Journal of Research & Development, vol. 51, No. 1/2, Jan./Mar. 2007, pp. 131-144, [retrieved on Nov. 23, 2013], Retrieved from the Internet:<URL:http://ieeexplore.ieee.org/>.*

(Continued)

*Primary Examiner* — Thuy Dao
*Assistant Examiner* — Geoffrey St Leger
(74) *Attorney, Agent, or Firm* — Ingrassia Fisher & Lorenz, P.C.

(57) ABSTRACT

One embodiment may take the form of a method and apparatus for remotely providing firmware to a wireless device. The wireless device may be configured to detect when the device's firmware is corrupted or may need updating. The device may then transmit a request for a firmware image on a first wireless communication channel. If the request is answered by an updating device, the wireless device may establish a communication with, and begin receiving the firmware image from, the updating device. Further, the wireless device may verify transmitted data and send an acknowledgment message to the updating device for each transmitted data packet.

15 Claims, 4 Drawing Sheets

(56) References Cited

OTHER PUBLICATIONS

Abrahamsson, D., Security Enhanced Firmware Update Procedures in Embedded Systems, Linköpings Universitet, Jun. 10, 2008, 85 pages, [retrieved on Nov. 23, 2013], Retrieved from the Internet:<URL:http://www.diva-portal.org/smash/get/diva2:174606/FULLTEXT01.pdf>.*

* cited by examiner

FIRMWARE RECOVERY OF WIRELESS DEVICES

TECHNICAL FIELD

The present invention relates generally to wireless devices, and more particularly to updating or recovering a firmware image of a wireless device.

BACKGROUND

Many wireless devices contain software and firmware to perform tasks on the wireless device. The firmware of a wireless device may be associated with a certain hardware device, such as a microprocessor, and may provide the structure in which software applications are executed. For example, the firmware may provide a structure for the visual interface software of the wireless device that allows the user to interact with the device. However, oftentimes firmware may become corrupted such that the wireless device may not function correctly. In these cases, the firmware image may need to be reinstalled on the wireless device. In other circumstances, it may be desirable to update the current firmware of a wireless device.

To update or reinstall a wireless device's firmware, the wireless device may receive a firmware image from a provider source. This provider source may interface with the wireless device to provide the firmware image. In many wireless devices, the provider source may provide the firmware image to the wireless device remotely, such that packets containing the firmware image may be transmitted from an updating device to the wireless device over a wireless communication channel. The wireless device may receive and store the transmitted packets in memory until all updating packets are received. Once all of the packets are received, the wireless device may install the new or updated image onto the wireless device.

Occasionally, however, packets transmitted by the updating device may be corrupted or lost in transmission before being received by the wireless device. For example, a packet sent by the updating device over a wireless channel may encounter noise on the communication channel that interferes with or corrupts the packet delivery. If the corrupted packet is combined with the other data packets of the firmware image, an invalid firmware image may be installed on the wireless device. An invalid firmware image may disable the wireless device or otherwise may prevent the device from operating correctly. Further, once a corrupted firmware image is installed on a wireless device, the device may no longer be able to correct the corrupted image remotely. Thus, the wireless device may need to be shipped to a vendor for correction.

Accordingly, what is needed is a method of remotely installing a valid firmware image of a wireless device when the device has a corrupted or invalid image. Further, the firmware image that is received from an updating device should be valid before the firmware is generated and installed on a wireless device.

BRIEF SUMMARY

One embodiment may comprise a method for updating firmware of a wireless device. The method may comprise the steps of transmitting a recover request message on a first channel with the recover request message requesting a first data packet, receiving a request ready message from an updating device on the first channel, receiving a first data packet from the updating device on the first channel and transmitting an acknowledgment message and a request for a second data packet on the first channel. Further, the acknowledgement message may indicate that the first data packet was received correctly.

Another embodiment may comprise a method for providing a firmware update to a wireless device. The method may include the steps of receiving a recover request message and transmitting a recover response message. The recover response message may be configured to establish a wireless communication with the wireless device on a first channel. The method may further include receiving a recover ready message from the wireless device on the first channel and transmitting a first data packet containing firmware update information.

Still another embodiment may comprise a system for updating firmware of a remote control. The system may comprise a set-top box for a television system. Further, the set-top box may comprise a microprocessor, a storage memory and a machine-readable medium containing data representing sequences of instructions. The sequence of instructions may, when executed by the microprocessor, cause the microprocessor to perform operations that comprise receiving a recover request message, transmitting a recover response message with the recover response message configured to establish a wireless communication with the remote control on a first channel, receiving a recover ready message from the remote control on the first channel and transmitting a first data packet containing firmware updating information.

DETAILED DESCRIPTION

One embodiment may take the form of a method and apparatus for remotely providing firmware to a wireless device. The wireless device may be configured to detect when the device's firmware is corrupted or otherwise may need updating. The device may then transmit a request for a firmware image on a first wireless communication channel. After a set period of time or an allotted number of transmit requests, the wireless device may switch to a second wireless communication channel and repeat the request process. If the request is answered by an updating device, the wireless device may establish a communication with, and may begin receiving the firmware image from, the updating device. Further, the wireless device may verify transmitted data and send an acknowledgment message to the updating device for each transmitted data packet. The wireless device may also be configured to scan available wireless communication channels to re-establish communications with an updating device that switches communication channels during transmission of the firmware image.

Another embodiment may take the form of a method for an updating device to provide a firmware image to a wireless device. The firmware image may be provided to the wireless device via a dedicated wireless communication channel in response to a received recovery request. Further, the updating device may receive an acknowledgment message from the wireless device indicating the status of the transmitted firmware image. If the firmware image is not received correctly by the wireless device, the updating device may continue to retransmit the firmware image to the wireless device until a complete image is correctly received by the wireless device.

Figure 1:
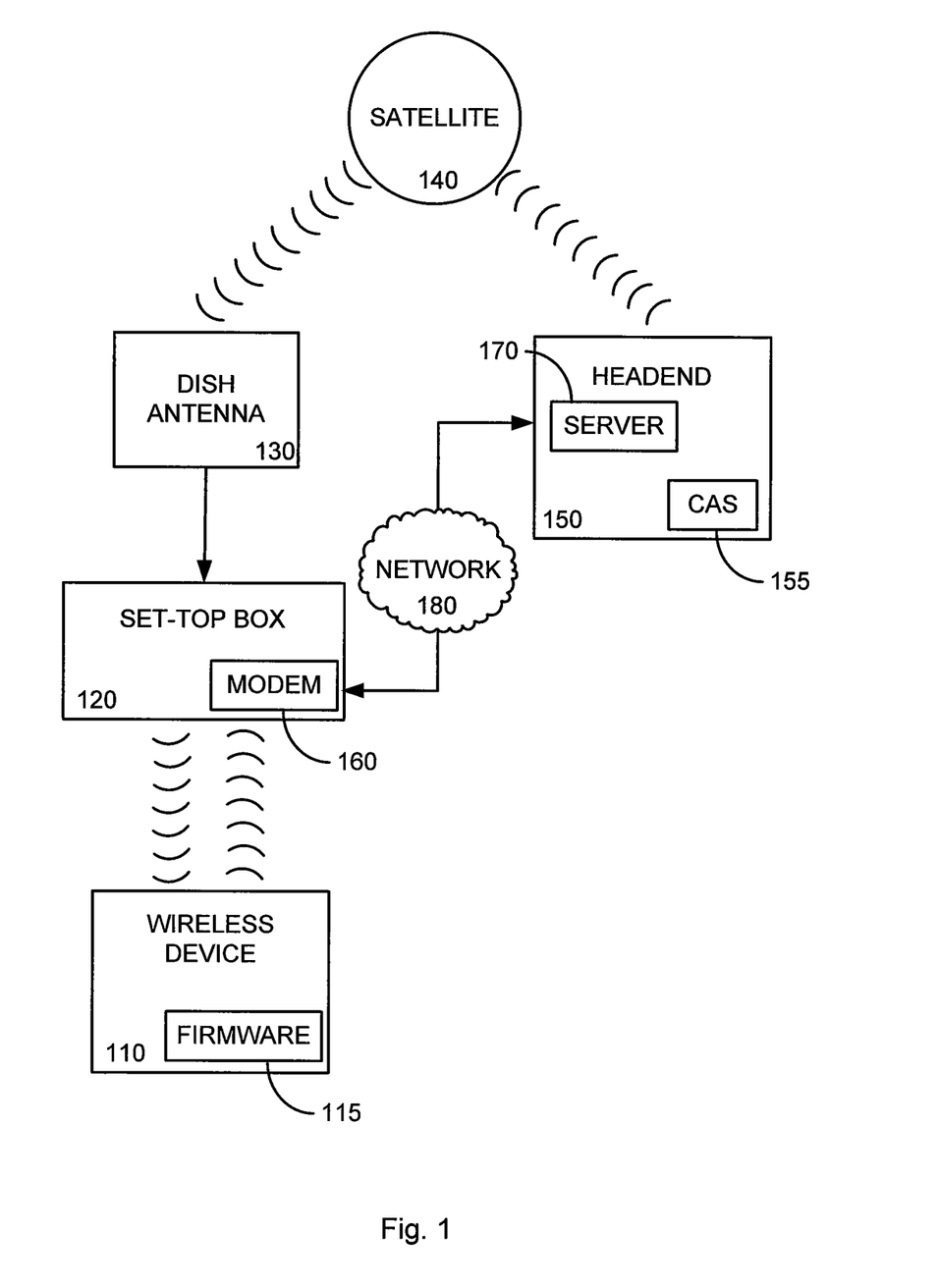
FIG. 1 depicts an exemplary satellite television system that may utilize a first embodiment to update a wireless device.

FIG. 1 depicts an exemplary satellite television system that may utilize a first embodiment to update a wireless device in communication with the satellite system. In this example, the wireless device may communicate with a set-top box (STB) of the television system to receive a firmware image to update or reinstall the firmware on the wireless device.

The television system depicted in FIG. 1 is but one example of a system that may utilize the methods described herein to update a wireless device 110. In this example, the wireless device 110 may communicate remotely with an STB 120 to receive a firmware image to update or reinstall the firmware 115 of the wireless device. Generally, the wireless device 110 may be any wireless device configured to remotely communicate with an updating device to receive a firmware image 115. In one example, the wireless device may be a remote control used to control the STB 120 or the user's television. Other examples of possible wireless devices 110 that may be used with the embodiments described below include, but are not limited to, handheld computing devices, personal digital assistants, mobile telephones, notebook computers, personal media players (PMP), music or audio players (such as an MP3 player), a wide area network (WAN) device, a Bluetooth device and so on. Further, the updating device may be any device that may establish a two-way communication with the wireless device to provide the firmware image remotely.

As mentioned above, the wireless device 110 may communicate with the STB 120 to receive a firmware image to update or perform a firmware recovery. The communication between the wireless device 110 and the STB 120 may be any type of wireless two-way communication. For example, the wireless device 110 and the STB 120 may communicate using a radio frequency (RF) or infrared (IR) signal. Generally, any wireless, two-way communication signal protocol may be used to facilitate the communication of messages between the wireless device 110 and the STB 120. In one example, the wireless device 110 and the STB 120 may communicate using an IEEE 802.15.4 protocol utilizing an RF signal.

In the example of FIG. 1, the STB 120 may receive the firmware image 115 from a satellite 140 through a dish antenna 130. However, it should be appreciated that the STB may receive the firmware image update from a service provider through any connection, including but not limited to a cable, fiber optics, or an internet connection. The dish antenna 130 of FIG. 1 may receive a transmitted signal containing the firmware image from the satellite 140 and may provide that received signal to the STB 120 along a cable. If the signal is encrypted, then the STB 120 may decrypt the received signal and process it accordingly. For example, if the received signal contains a firmware image for the wireless device 110, the STB 120 may store the firmware image information in memory until such information is requested by the wireless device 110. The firmware image and related information may be sent to the STB 120 either embedded within a television signal or separate. Once the STB 120 has received the firmware image, a wireless device 110 may communicate with the STB to receive the image 115.

The updated firmware image may be generated by a headend 150 and transmitted to the satellite 140, either embedded within a television signal or separately from the television signal. As described above, the satellite 140 may then retransmit the signal containing the firmware image to the user's dish antenna 130. To generate the updated firmware image, a conditional access system (CAS) 155 may be included in the headend 150. The CAS 155 may convert the firmware image into an encrypted signal that may be transmitted to the satellite 140 and rebroadcast to the STB 120 of the user.

By providing for the headend 150 to transmit the firmware image to the user's STB 120, several wireless devices 110 may be updated at once from a central location. For example, the satellite television provider may create a new or updated firmware image that is to be distributed to several similar or identical wireless devices, such as remote controls of several users. The firmware image may then be transmitted by the headend 150 to the satellite 140. The satellite may, in turn, provide the updated firmware image to several STBs through the satellite 140. Each STB that receives the firmware image may be capable of communicating with a separate wireless device to update the device. In this manner, the headend 150 may be utilized to provide a firmware image to several wireless devices at once from a centralized location.

Further, it is not necessary that the STB 120 receive the firmware image from a satellite 140. In another example, the STB 120 may be connected to a server 170 through a modem 160 located within the STB 120 or externally. The modem 160 may be used to communicate with the server 170 directly or through a network 180 to receive the firmware image to eventually be transmitted to the wireless device 110. The STB 120 may communicate with the server 170 through several types of connections, including, but not limited to, a typical phone line, a wireless connection, an Ethernet connection, an Internet connection, a wide-area network (WAN) connection, a local-area network (LAN) or a coaxial connection. Further, in one example, the server 170 may be located at the headend 150 of the television satellite system. Thus, the firmware image may be stored on the server 170 such that several STBs may access the server and download the firmware image into memory.

Figure 2:
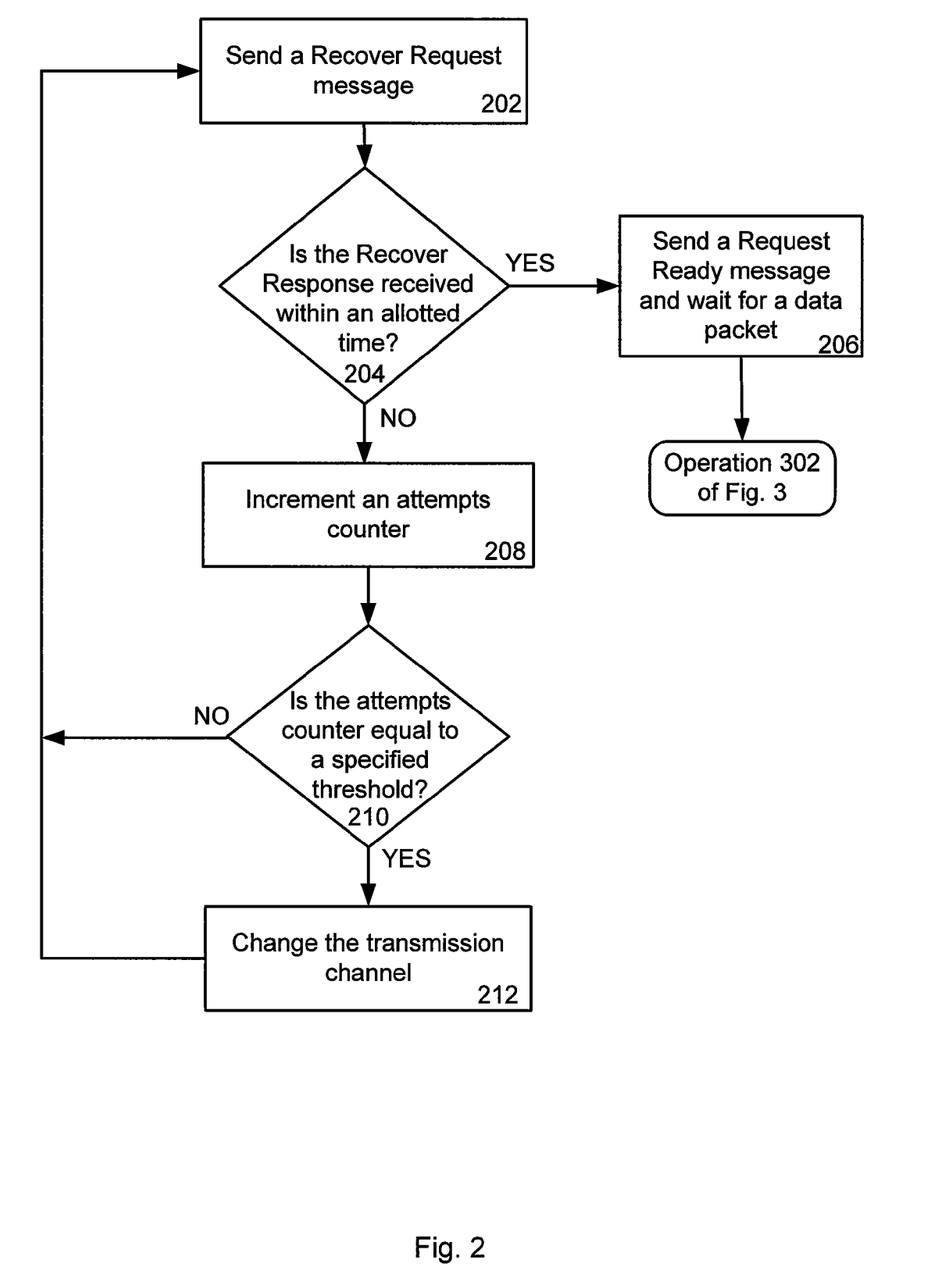
FIG. 2 is a flowchart depicting a method for a wireless device to request a firmware update from an updating device.

Once the STB 120 has received and stored the firmware image, the wireless device 110 may communicate with the STB to update or reinstall the device's firmware image 115. FIG. 2 is a flowchart depicting a method for a wireless device to request a firmware image from an updating device. In this example, the wireless device may be a remote control and the updating device may be a STB.

The embodiment may begin in operation 202, in which the wireless device transmits a "recover request" message. The recover request message may be a general request for a firmware image from any updating device within range of the wireless device. As described above, generally any two-way wireless communication protocol may be utilized by the wireless device to transmit the recover request message. For example, the recover request message may be transmitted on an RF channel using an IEEE 802.15.4 protocol. Further, the recover request message may be transmitted by the wireless device to any device that may properly receive and interpret the recover request message. Thus, any STB or other updating device that may receive and recognize the recover request message may begin communications with the wireless device and provide the firmware image to the device.

The recover request message may be transmitted by the wireless device in response to the wireless device detecting a corrupted firmware image. In one example, the wireless device may perform a checksum of the device's firmware to determine the validity of the firmware image. If the image is corrupted or incorrect, the wireless device may then transmit the recover request message on a RF channel as described above. Further, it should be appreciated that a corrupted firmware image may negatively affect the capability of the wireless device to transmit the recover request message. To ensure that the recover request message may be sent when an invalid firmware image is detected, the request message and transmission protocol to send the request message may be stored in write protected flash or other one-time programmable memory of a boot sector within the wireless device. In one embodiment, only a portion of the transmission protocol may be stored in memory to limit the size of the information stored in the protected boot sector.

The boot sector may be locked such that the information stored within the boot sector cannot be overwritten. When an invalid firmware image is detected, the locked boot sector may be accessed to permit the recover request message to be created and transmitted, so that the wireless device may begin receiving an updated or recovery firmware image. Thus, even though the wireless device may contain an invalid firmware image, the device may still generate and transmit the recover request message to correct the invalid firmware.

In operation 204, the wireless device may determine whether a recover response message is received. As described in more detail below with reference to FIG. 4, an updating device may receive the recover request message sent in operation 202. Upon receipt, the updating device may respond by transmitting a "recover response" message to the wireless device on the same channel that the recover request was received. To facilitate the receipt of the recover response message, the wireless device may monitor the channel on which the recover request message was transmitted for an allotted period of time. For example, the wireless device may monitor the communication channel for three seconds after transmitting the recover request message for the recover response message. However, the length of time that the wireless device may wait for the recover response message from the updating device may vary in alternate embodiments to allow the wireless device to detect a recover response message from an updating device.

If the embodiment determines in operation 204 that a recover response message is received, the wireless device may transmit a "request ready" message to the updating device in operation 206 on the same channel that carried the recover response message. The request ready message may establish a two-way communication with the updating device. Further, the request ready message may also include a data packet identifier that identifies a data packet that may be needed by the wireless device. For example, the firmware image being provided to the wireless device may be transmitted in a series of data packets. Each data packet may contain a portion of the firmware image code. In some circumstances, the communication between the wireless device and the updating device may be disrupted before the wireless device has received all of the firmware image data packets. To avoid the situation of the wireless device again receiving a data packet it has already validly received, the wireless device may store a list of each valid data packet it has received from an updating device. Alternatively, the device may expect data packets to be received in a predefined sequential order. Thus, when the wireless device transmits the request ready message and attempts to communicate with an updating device, the wireless device may specifically request data packets that it has not already received. When the updating device receives the request ready message including the identification of the requested data packet, the updating device may select the correct data packet to transmit to the wireless device.

After the request ready message is transmitted by the wireless device, it may begin waiting for receipt of the requested data packet from the updating device. This operation is similar to and described in more detail with reference to operation 302 of FIG. 3.

If the embodiment determines in operation 204 that a recover response message is not received within the allotted time frame, a counter may be incremented in operation 208. This counter may count the number of unanswered recover requests sent on a particular channel by the wireless device. Thus, for each recover request sent on a particular channel by the wireless device that is not met with a recover response by the updating device, the counter may be incremented in operation 208.

In operation 210, the embodiment may determine whether the counter has reached a threshold value. The threshold value of the counter may control the number of times that the wireless device may transmit the recover request message and wait for a response on a particular channel. If the embodiment determines that the counter is less than the threshold value, the embodiment may return to operation 202 and send the recover request on the same channel. However, if the counter is equal to the threshold value, the wireless device may change to another communication channel in operation 212 and return to operation 202. In this manner, the wireless device may transmit the recover request on each channel of the wireless device a predetermined number of times per channel until a recover response message is received from the updating device. The threshold value may be set at any value. For example, the threshold value may be set at three such that the wireless device may attempt to transmit the recover request message on a particular channel three times.

In another embodiment, operations 208 and 210 may be omitted. In this embodiment, the wireless device may transmit the recover request message on a particular RF channel in operation 202. If a recover response message is not received, the wireless device may change to an alternate channel and retransmit the recover request message. Thus, in this particular embodiment, the recover request message may be transmitted on each channel once, switching between channels after every transmission. The wireless device may continue to cycle through the available channels until a recover response message is received. This same functionality may be achieved by setting the counter threshold value to one in the embodiment depicted in FIG. 2.

Figure 3:
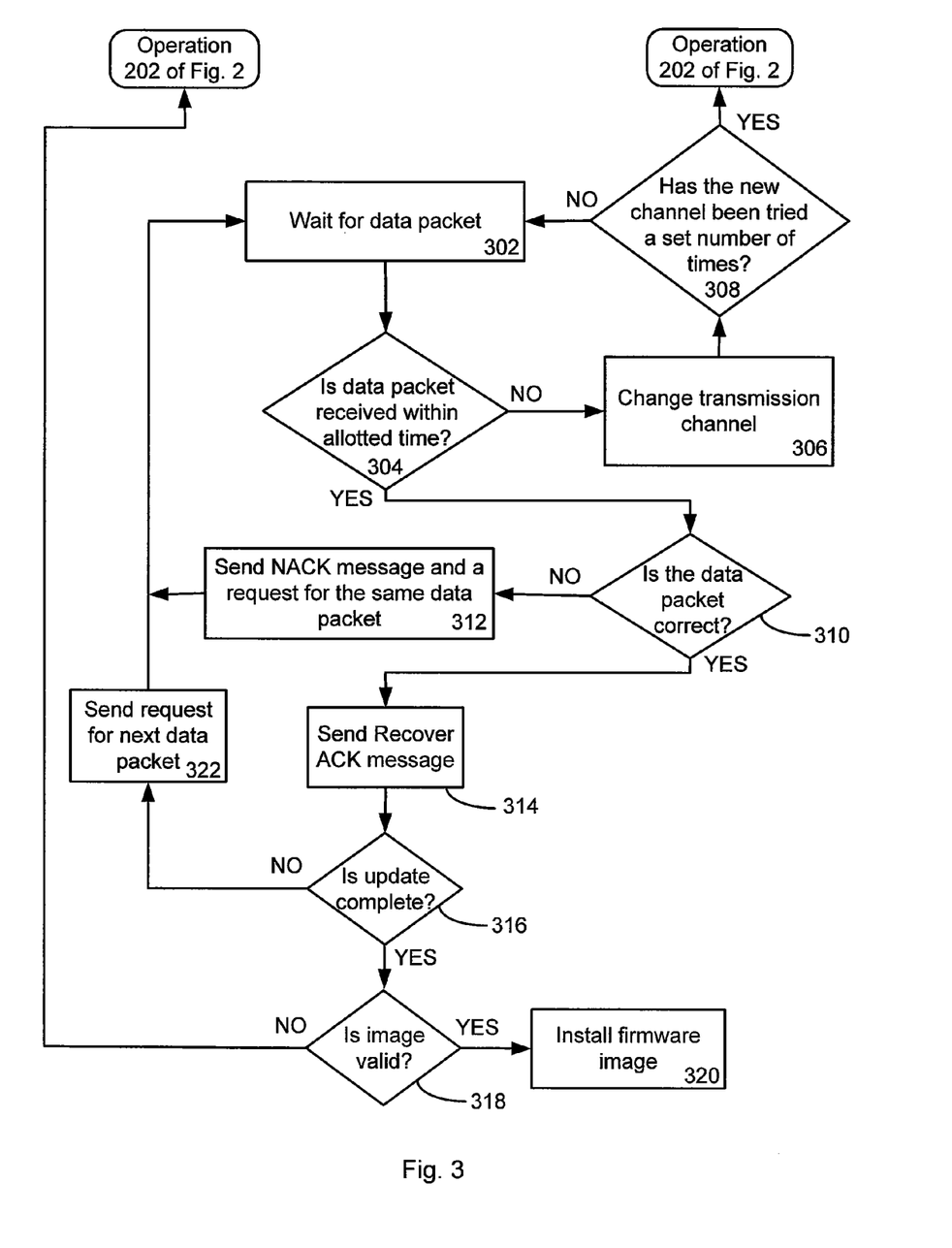
FIG. 3 is a flowchart depicting a method for a wireless device to receive a firmware update from an updating device.

FIG. 3 is a flowchart depicting a method for a wireless device to receive a firmware update from an updating device. In this embodiment, the wireless device may communicate with the updating device to receive the firmware image that may be stored and installed on the wireless device.

The embodiment may begin in operation 302 as the wireless device waits for a data packet from the updating device. The communication between the wireless device and updating device may have been previously established as described above with reference to FIG. 2. Further, the wireless device may have previously requested a particular data packet from the updating device. In operation 304, the embodiment may determine whether the data packet has been received within an allotted time frame. The wait time for the data packet may vary. For example, the wireless device may wait for the data packet from the updating device for one second. If the data packet is not received before being timed out, the wireless device may change to an alternate RF channel (or set of channels) in operation 306.

After changing to an alternate RF channel, the embodiment may determine whether the wireless device has attempted to receive the data packet on the new RF channel a set number of times in operation 308. For example, the wireless device may be configured to wait for the requested data packet from the updating device on each available channel up to three times. In this example, the wireless device may cycle through the available RF channels three times searching for the data packet. Thus, if the embodiment determines in operation 308 that the new channel set in operation 306 has not been tried the set number of times, the embodiment may return to operation 302 and wait for the data packet on the new channel. However, if the embodiment determines that the wireless device has waited for the data packet on each available channel for at least the predetermined number of times, the embodiment may attempt to re-establish communications with the same updating device or communicate with a new updating device. This is demonstrated in FIG. 3 by returning to operation 202 of FIG. 2.

Returning now to operation 304, if the embodiment determines that a data packet is received within the allotted time, the wireless device may then check the validity of the data packet in operation 310. Generally, to determine if the received data packet is valid, the embodiment may perform any known procedure for verifying the validity of received data. For example, the wireless device may perform a checksum procedure on the received data packet to determine the validity of the information.

If the verification of the data packet in operation 310 indicates that the received data packet is not valid, the wireless device may transmit a non-acknowledgment (NACK) message to the updating device in operation 312. This message indicates to the updating device that the data packet may have been corrupted during transfer. For example, the channel that the wireless device and the updating device are communicating on may encounter noise during transmission of a data packet. This noise may corrupt the information contained in the data packet such that the data packet is not valid. In this circumstance, the wireless device may inform the updating device of the invalid data packet using the NACK message. Further, along with the NACK message, the wireless device may request the same data packet that was received incorrectly from the updating device. Upon sending the NACK message and the request for a replacement of the same data packet, the embodiment may return to operation 302 and wait for the requested data packet.

If the verification procedure of operation 310 indicates that the data packet was received correctly, the wireless device may transmit a "recover acknowledgment" (ACK) message to the updating device in operation 314. The recover ACK message may indicate to the updating device that the transmitted data packet was received correctly by the wireless device. In one embodiment, the recover ACK message may also contain an indication as to which data packet was received by the wireless device. In this embodiment, the updating device may maintain a list of transmitted data packets that are validly received by the wireless device. This list may assist the updating device in transmitting the correct data packets to the wireless device, without sending a particular data packet multiple times. In this manner, the wireless device and the updating device may coordinate their respective lists of correctly received data packets when communicating.

After the recover ACK message is transmitted by the wireless device, the embodiment may determine whether the firmware update is complete in operation 316. The firmware update may be complete when all of the data packets needed to generate and install the firmware image are validly received by the wireless device. As discussed above, the wireless device may store a list of fully received data packets. This list may be referenced by the wireless device in operation 316 to determine if the firmware image update is complete. Alternatively, the update completion may be monitored by the updating device. In this case, the updating device may provide a "update complete" message to the wireless device when all data packets have been transmitted and acknowledged.

If the embodiment determines that data packets are still needed by the wireless device to compile the firmware image, the embodiment may transmit a request for the next data packet in operation 322. After requesting the next data packet from the updating device, the embodiment may return to operation 302 and wait for the requested data packet.

If the embodiment determines that all data packets have been received by the wireless device in operation 316, the embodiment may then determine whether the firmware image received by the updating device is valid. Generally, the embodiment may perform any known procedure for verifying received data to verify the validity of the firmware image. In one example, the wireless device may perform a checksum procedure on the firmware image to determine the validity of the information. If the received firmware image is not valid, the wireless device may discontinue the communication with the updating device and begin searching for another updating device to communicate with by transmitting a new recover request message. Further, the wireless device may retransmit the recover request message on a separate RF channel to communicate with the same updating device or a different updating device. This operation is demonstrated in FIG. 3 by returning to operation 202 of FIG. 2.

If the embodiment determines that the received firmware image is valid, the wireless device may install the new firmware image saved in memory in operation 320 and optionally, restart. The installation and restart of the wireless device may update the firmware image of the device, or may repair a corrupted firmware image. The embodiments of FIGS. 2 and 3 may be repeated as necessary by the wireless device to continue to update or repair the firmware image through the life of wireless device.

Figure 4:
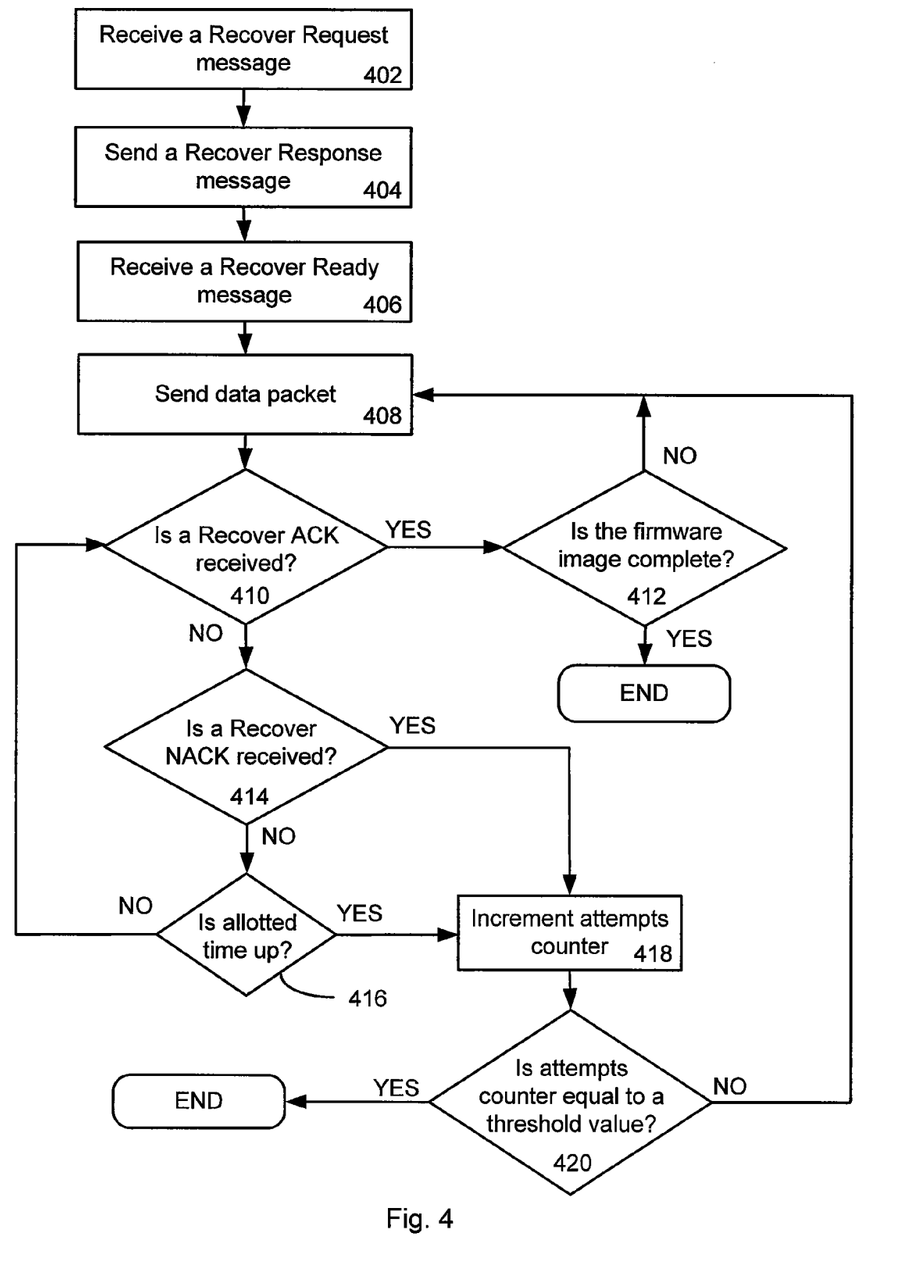
FIG. 4 is a flowchart depicting a method for an updating device to remotely provide a firmware image to a wireless device.

FIG. 4 is a flowchart depicting a method for an updating device to provide an updated firmware image to a wireless device. This embodiment may be used with the embodiments of FIGS. 2 and 3 to provide a new firmware image to a wireless device. As described above, the updating device may take the form of an STB. However, generally the updating device may be any electronic device capable of remotely providing a firmware image to a wireless device.

This embodiment may begin in operation 402 when the updating device receives a recover request message transmitted by a wireless device. The recover request message may be received via any two-way communication protocol supported by the updating device, as described above with reference to FIG. 1. Further, the recover request message may indicate to the updating device that the wireless device is requesting to establish a communication with the updating device on the RF channel that the recover request message was received.

In response to receiving the recover request message, the updating device may transmit a recover response message to the wireless device in operation 404. The recover response message may be transmitted on the same RF channel and using the same communication protocol as the recover request. After sending the recover response message, the updating device may then receive a recover ready message from the wireless device in operation 406, establishing a communication between the two devices. Further, the recover ready message may indicate that the wireless device is ready for a first data packet containing information about a firmware image that may be sent to and installed by the wireless device. The recover ready message may also indicate which particular data packet the wireless device may be requesting.

In operation 408, the updating device may transmit a first data packet to the wireless device. This data packet may be transmitted on the same RF channel as the messages of operations 402-406 are transmitted. Similar to the data packet of FIGS. 2 and 3, this data packet may contain information about or a portion of the firmware code. Prior to transmitting the data packets in operation 402, the updating device may receive the data packets from a separate source, such as a satellite or server as described in FIG. 1. In the embodiment where the recover ready message received in operation 406 includes an indication of which particular data packet is requested by the wireless device, the updating device may reference a list of data packets maintained by the updating device to locate and transmit the particular requested data packet. In this embodiment, the updating device may also maintain a list of transmitted data packets to the wireless device to assist in preventing the transmission of a data packet multiple times to the wireless device.

After transmitting the data packet, the updating device may wait for a recover ACK message from the wireless device in operation 410. The recover ACK message may indicate to the updating device that the transmitted data packet was validly received by the wireless device. If the recover ACK message is received in operation 410, then the embodiment may determine whether the entire firmware image has been transmitted to the wireless device in operation 412. In one example, the recover ACK message received by the updating device may include an indication that a new data packet is requested by the wireless device. In such an embodiment, the updating device may return to operation 408 and transmit the requested data packet upon receipt of the response ACK.

In another example, the updating device may maintain a list of acknowledged data packets received by the wireless device and may continue to transmit any unacknowledged data packets by returning to operation 408 until all data packets are sent to the wireless device. However, if the embodiment determines in operation 412 that the entire firmware image has been sent to and acknowledged by the wireless device, the embodiment may take no further action. Alternatively, the embodiment may send an update complete message to the wireless device to indicate that the update of the firmware image is complete.

If a recover ACK message is not received in operation 410, the embodiment may determine if a recover non-acknowledgement (NACK) message is received in operation 414. The NACK message may indicate to the updating device that the transmitted data packet was not validly received by the wireless device. Rather, some corruption of the data packet may have occurred prior to receipt by the wireless device. If a recover NACK is not received in operation 414, it may be determined whether the updating device has waited for an allotted amount of time in operation 416. The allotted amount of time of operation 416 may be set at any desired time. For example, the allotted amount of time may be set at five seconds. If the allotted time has not passed, the embodiment may return to operation 410 to continue waiting for a recover ACK or recover NACK message. Thus, in the above example, the updating device may continue to monitor for a recover ACK or recover NACK message from the wireless device for the allotted amount of time, i.e. five seconds.

If a recover NACK message is received in operation 414 or the updating device times out in operation 416, the embodiment may increment a counter that counts the number of failed attempts to transmit a particular data packet in operation 418. The counter may increment when a recover NACK message is received that indicates that the data packet received by the wireless device was corrupted. If the updating device times out in operation 416, the wireless device may be out of range to receive the data packet or may no longer be communicating with the updating device on the particular wireless communication channel. In either case, a failed attempt to provide the data packet to the wireless device is counted in operation 418.

In operation 420, the embodiment may determine whether the number of failed attempts has reached a threshold value. The threshold value of the counter may count the number of times that the updating device receives a response NACK message. The threshold value may be set at any number as desired. For example, the updating device may attempt to provide the requested data packet to the wireless device five times.

If the threshold value has not been reached, the embodiment may return to operation 408 and the updating device may resend the requested data packet. However, if the number of failed attempts equals the threshold value, the updating device may determine that the communication with the wireless device has ceased and may enter a state to wait for another recover request message. In an alternate embodiment, the updating device may begin to cycle through the available RF channels in an attempt to re-establish communications with the wireless device to continue the firmware image download. In this embodiment, the updating device may return to operation 402 when the wireless device is found.

It should be noted that the flowchart of FIGS. 2-4 are illustrative only. Alternative embodiments of the present invention may add operations, omit operations, or change the order of operations without affecting the spirit or scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method for updating firmware of a wireless device comprising:
   detecting at the wireless device a corrupted firmware image;
   generating a recover request message from a locked boot sector of a memory of the wireless device in response to detecting the corrupted firmware image;
   transmitting the recover request message on a first Radio Frequency (RF) channel in response to detecting the corrupted firmware image, the recover request message requesting a first data packet;
   receiving a request ready message from an updating device on the first RF channel;
   receiving a first data packet from the updating device on the first RF channel;
   determining whether the first data packet is received within an allotted time frame;
   in the event that the first data packet is received within the alloted time frame, transmitting an acknowledgment message and a request for a second data packet on the first RF channel, the acknowledgement message indicating that the first data packet was received correctly; and
in the event that the first data packet is not received within the allotted time frame, retransmitting the recover request message on a second RF channel in response to not receiving the data packet within the alloted time frame,
wherein the wireless device is a remote control to a set-top box.

2. the method of claim 1 further comprising:
incrementing a counter in the event that the request ready message is not received, the counter configured to count the number of recover request messages sent by the wireless device on the first channel.

3. The method of claim 2 further comprising:
determining whether the counter is greater than a threshold value; and
in the event that the counter is greater than a threshold value, retransmitting the recover request message on a second channel.

4. The method of claim 1 further comprising:
verifying the first data packet; and
in the event that the first data packet is not verified, transmitting a non-acknowledgment message and a request for the first data packet.

5. The method of claim 1 further comprising:
verifying the firmware image; and in the event that the firmware image is determined to be valid, rebooting the wireless device.

6. The method of claim 1 further comprising:
storing a transmission protocol in the locked boot sector of the memory of the wireless device, wherein the locked boot sector of the memory is incapable of being written to, and wherein the recover request message is transmitted using the transmission protocol stored in the locked boot sector.

7. A method for providing a firmware update to a wireless device comprising:
receiving a recover request message that was generated from a locked boot sector of a memory of the wireless device in response to detecting a corrupted firmware image;
transmitting a recover response message, the recover response message configured to establish a wireless communication with the wireless device on a first RF channel;
receiving a recover ready message from the wireless device on the first RF channel;
transmitting a first data packet containing firmware update information on the first RF channel;
receiving a recover non-acknowledgment message from the wireless device on the first RF channel;
incrementing a counter, the counter configured to count the number of recover non-acknowledgment messages received, and retransmitting the first data packet on the first RF channel; and
in response to the counter equaling a threshold value, retransmitting the first data packet on a second RF channel to re-establish communications with the wireless device on the second RF channel,
wherein the wireless device is a remote control to a set-top box.

8. The method of claim 7 further comprising:
receiving a recover acknowledgment message from the wireless device on the first RF channel; and
transmitting a second data packet containing firmware update information.

9. The method of claim 8 further comprising:
storing the acknowledgment message in a list in memory, the list configured to maintain the acknowledged data packets.

10. A system for updating firmware of a remote control, the system comprising:
the remote control having a locked boot sector from which the remote control generates a recover request message in response to detecting a corrupted firmware image on the remote control;
a set-top box for a television system, the set-top box comprising:
a microprocessor;
a storage memory; and
a machine-readable medium having stored thereon data representing sequences of instructions that, when executed by the microprocessor, cause the microprocessor to perform operations comprising:
receiving the recover request message;
transmitting a recover response message, the recover response message configured to establish a wireless communication with the remote control on a first RF channel;
receiving a recover ready message from the remote control on the first RF channel;
transmitting a first data packet on the first RF channel, the first data packet containing firmware updating information;
receiving a recover non-acknowledgment message from the remote control on the first RF channel;
incrementing a counter, the counter configured to count the number of recover non-acknowledgment messages received, and retransmitting the first data packet on the first RF channel; and
in response to the counter equaling a threshold value, retransmitting the first data packet on a second RF channel to re-establish communications with the remote control on the second RF channel.

11. The system of claim 10 wherein the first data packet is stored in storage memory on the system.

12. The system of claim 11 further comprising:
a satellite dish antenna to receive a signal from a satellite, the signal configured to provide the first data packet to the set-top box for storage in the storage memory.

13. The system of claim 11 wherein the set-top box is configured to receive a signal via a cable, the signal configured to provide the first data packet to the set-top box for storage in the storage memory.

14. The system of claim 11 further comprising: a modem configured to communicate over a network with a server, the communication configured to provide the first data packet to the set-top box for storage in the storage memory.

15. The system of claim 10 wherein the first data packet is generated by a head end.

* * * * *